United States Patent Office 2,865,902
Patented Dec. 23, 1958

2,865,902
CINCHONINIC ACID DERIVATIVES

Joseph A. Blanchette, East Longmeadow, Mass., assignor to Monsanto Chemical Company, St. Louis, Mo., a corporation of Delaware No Drawing. Application September 19, 1956
Serial No. 610,708

4 Claims. (Cl. 260—93.5)

This invention relates to new polystyrene derivatives containing reactive groups. More particularly, the invention relates to polystyrenes modified with cinchoninic acid.

Isatin has been reacted with aryl methyl ketones to form materials having pharmaceutical activity, e. g., in combating malaria. However, low molecular weight pharmaceutical materials often pass through the body with such rapidity that frequent dosages are necessary to produce the desired effect. Higher molecular weight materials, because of their slower rate of diffusion, remain in the body for a longer time, making such frequent dosages unnecessary.

One object of this invention is to provide new polystyrene derivatives containing reactive groups.

Another object is to provide polystyrene derivatives which are particularly suitable for use as pharmaceutical materials.

A further object is to provide cinchoninic acid-modified polystyrenes.

These and other objects are attained by reacting isatin with an acetylated polystyrene.

The following examples are given to illustrate the invention. Parts mentioned are parts by weight.

Example I

A styrene homopolymer having a molecular weight of about 2,000 is acetylated by a Friedel-Crafts reaction to form an acetylated polystyrene containing one acetyl group per aromatic ring. Five parts of the acetylated polystyrene and 5 parts of isatin are dissolved in 100 parts of pyridine, and 65 parts of 30% aqueous potassium hydroxide is added. The solution is refluxed for 3 days and then poured into methanol. The small amount of insoluble material is removed by filtration, and the methanol solution is then acidified, causing the polymer to precipitate. The precipitate is removed from the solution by filtration and dissolved in tetrahydrofuran. This solution is added dropwise to water to reprecipitate the polymer. The product may be converted to the sodium salt for use as a pharmaceutical material.

Example II

A styrene homopolymer having a molecular weight of about 30,000 is acetylated by a Friedel-Crafts reaction to form an acetylated polystyrene containing one acetyl group per aromatic ring. Five parts of the acetylated polystyrene and 5 parts of isatin are dissolved in 100 parts of pyridine, and 65 parts of 30% aqueous potassium hydroxide is added. The solution is refluxed for 3 days and then poured into methanol. The small amount of insoluble material is removed by filtration, and the methanol solution is then acidified, causing the polymer to precipitate. The precipitate is removed from the solution by filtration and dissolved in tetrahydrofuran. This solution is added dropwise to water to reprecipitate the polymer. The product is dissolved in dioxane to form a solution of 50 parts of polymer in 50 parts of solvent. This solution is cast onto a glass plate to form a clear, flexible film.

The acetylated polystyrenes which are reacted with isatin to form the products of this invention are styrene homopolymers which are substituted on the para-positions of the aromatic rings with acetyl radicals. They may be prepared by reacting acetic anhydride or an acetyl halide with a homopolymer of a styrene compound such as styrene, alpha-methyl styrene, and ar-substituted derivatives thereof wherein the ar-substituents are aliphatic hydrocarbon radicals containing 1–4 carbon atoms. The reaction is accomplished in a suitable solvent medium such as carbon disulfide in the presence of a Friedel-Crafts catalyst. The styrene homopolymers, before acetylation, have molecular weights ranging from about 1,000 to 60,000. The degree of acetylation may be controlled to yield products containing 0.1–1 acetyl radical per aromatic ring. The cinchoninic acid-modified polymers obtained from polystyrenes in which 50–100% of the aromatic rings have been acetylated form a preferred embodiment of this invention.

The acetylated polystyrenes are reacted with isatin at reflux temperatures in a basic solvent such as pyridine, trimethyl amine, etc., in the presence of a strong alkaline catalyst such as potassium hydroxide, sodium hydroxide, etc. The ratio of isatin to acetylated polystyrene in the reaction mixture may vary from about 0.5–1 mol of isatin per mol of acetylated polystyrene unit.

The products of this invention are cinchoninic acid-modified polystyrenes having the cinchoninic acid radicals attached at their 2-carbon atoms to the para-positions of the aromatic rings of the polymer. The number of cinchoninic acid radicals in the polymers may be varied by varying the degree of acetylation of the styrene homopolymer or by varying the molar ratio of isatin to acetylated polystyrene in the reaction mixture. The polymers are soluble in common organic solvents such as higher alcohols, esters, ethers, ketones, hydrocarbons, tetrahydrofuran, etc.

Compositions containing the polymers of this invention may be modified by the incorporation of conventional additives such as dyes, pigments, fillers, extenders, etc. The polymers may be used alone or in combination with other polymeric materials, e. g., with other vinylidene polymers.

The polymers of this invention are useful in many of the common applications for polymeric materials, e. g., as film-forming materials, suspending agents, polyelectrolytes, etc. They are particularly useful as pharmaceutical materials. For the latter application, the lower molecular weight polymers are preferred.

It is obvious that many variations may be made in the products and processes set forth above without departing from the spirit and scope of this invention.

What is claimed is:

1. A p-substituted homopolymer of a styrene compound of the group consisting of styrene, alpha-methyl styrene, and ar-substituted derivatives thereof wherein the ar-substituent is an aliphatic hydrocarbon radical containing 1–4 carbon atoms, said homopolymer being substituted on the para-positions of the aromatic rings with cinchoninic acid which is attached to the aromatic rings at the 2-carbon atom.

2. A p-substituted homopolymer as in claim 1 wherein the styrene compound is styrene.

3. A p-substituted homopolymer as in claim 1 wherein the homopolymer before substitution on the para-positions of the aromatic rings has a molecular weight less than 10,000.

4. A p-substituted homopolymer as in claim 1 wherein 50–100% of the aromatic rings bear cinchoninic acid substituents.

References Cited in the file of this patent

Lindwall et al.: "Jour. Am. Chem. Soc.," vol. 54, pp. 4739–44 (1932). (Copy in Pat. Off. Sci. Lib.)

Boundy et al.: "Styrene, Its Polymers, Copolymers and Derivatives," pp. 682–3 (1952). (Copy in Pat. Off. Sci. Lib.)